US009608911B2

(12) United States Patent
Krishnamurthy (10) Patent No.: US 9,608,911 B2
(45) Date of Patent: Mar. 28, 2017

(54) SYSTEMS AND METHODS FOR PREVENTING SOURCE SUPPRESSION OF ROUTED INFORMATION IN A LOAD-BALANCED NETWORK

(71) Applicant: Dell Products L.P., Round Rock, TX (US)

(72) Inventor: Karthik Krishnamurthy, Tamilnadu (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 602 days.

(21) Appl. No.: 13/784,372

(22) Filed: Mar. 4, 2013

(65) Prior Publication Data

US 2014/0247713 A1 Sep. 4, 2014

(51) Int. Cl.
*H04L 12/26* (2006.01)
*H04L 12/803* (2013.01)
*H04L 12/935* (2013.01)
*H04L 12/931* (2013.01)

(52) U.S. Cl.
CPC ............ *H04L 47/125* (2013.01); *H04L 49/30* (2013.01); *H04L 49/35* (2013.01)

(58) Field of Classification Search
CPC ........ H04L 49/35; H04L 49/30; H04L 47/125

USPC .......................................... 370/230, 392, 401
See application file for complete search history.

(56) References Cited

U.S. PATENT DOCUMENTS

| 6,801,950 | B1* | 10/2004 | O'Keeffe et al. ............. 709/238 |
| 6,901,072 | B1* | 5/2005 | Wong .................. H04L 12/4645 370/360 |
| 2012/0087372 | A1* | 4/2012 | Narasimhan .................. 370/392 |

\* cited by examiner

*Primary Examiner* — Andrew Lai
*Assistant Examiner* — Albert Shih
(74) *Attorney, Agent, or Firm* — Haynes and Boone, LLP (57) ABSTRACT

Systems, devices, and methods for routing information from one network to a load balancing network are provided. The provided system includes a server, and at least one switch in communication with the server over a physical port. The switch includes a network interface component configured to receive information from the server on the physical port, a memory configured to store the address of the server and a virtual port in an address table, the virtual port pointing to the physical port, and one or more processors coupled to the network interface component and the memory. The one or more processors are configured to identify the physical port on which the information arrives and assign the identified physical port to the virtual port and route information from a different network to the server over the physical port pointed to by the virtual port stored in the address table.

20 Claims, 7 Drawing Sheets

SYSTEMS AND METHODS FOR PREVENTING SOURCE SUPPRESSION OF ROUTED INFORMATION IN A LOAD-BALANCED NETWORK

BACKGROUND

Technical Field

Embodiments disclosed herein are related to systems and methods for routing information from a first network over a load balanced network. In particular, embodiments disclosed herein provide systems and methods for routing information from a first network to a second network having a load balancing server without dropping the information from the first network.

Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, in certain information handling systems a load balancing server may be used to balance the load between nodes of the system, wherein the load balancing server may have multiple interfaces each having a different internet protocol (IP) address and a different media access control (MAC) address. However, when information from a different network is received by the system, the nodes are not able to route the information to the load balancing server without dropping the information due to source suppression. Consequently, there is a need for systems and methods for routing information from one network to another network having a load balancing server without dropping the information.

BRIEF DESCRIPTION OF THE FIGURES

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, an information handling system is provided. The information handling system includes a server, and at least one switch in communication with the server over a physical port. The switch includes a network interface component configured to receive information from the server on the physical port, a memory configured to store the address of the server and a virtual port in an address table, the virtual port pointing to the physical port, and one or more processors coupled to the network interface component and the memory. The one or more processors are configured to identify the physical port on which the information arrives and assign the identified physical port to the virtual port.

Consistent with some embodiments, there is also provided a switch. The switch includes one or more processors and a memory, the memory storing instructions that, when executed by the one more processors, cause the switch to perform a method. The method includes steps of identifying a physical port in communication with a server and an address of the server, storing the identified address and physical port in the memory, receiving information from a gateway device, learning a port on which the information is received as a server port from the received information; assigning the learned server port to a virtual port that points to the stored physical port, receiving information from a network different from a network the switch is on, and routing the information from the different network to the server over the physical port pointed to by the virtual port.

Consistent with some embodiments, there is further provided a method of routing information from a first network to a server on a second network. The method includes steps of identifying a physical port in communication with the server and an address of the server, storing the identified address and physical port in a memory, receiving information from a gateway device, learning a port on which the information is received as a server port from the received information, assigning the learned server port to a virtual port that points to the stored physical port, receiving information from the first network, and routing the information from the first network to the server over the physical port pointed to by the virtual port.

These and other embodiments will be described in further detail below with respect to the following figures.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
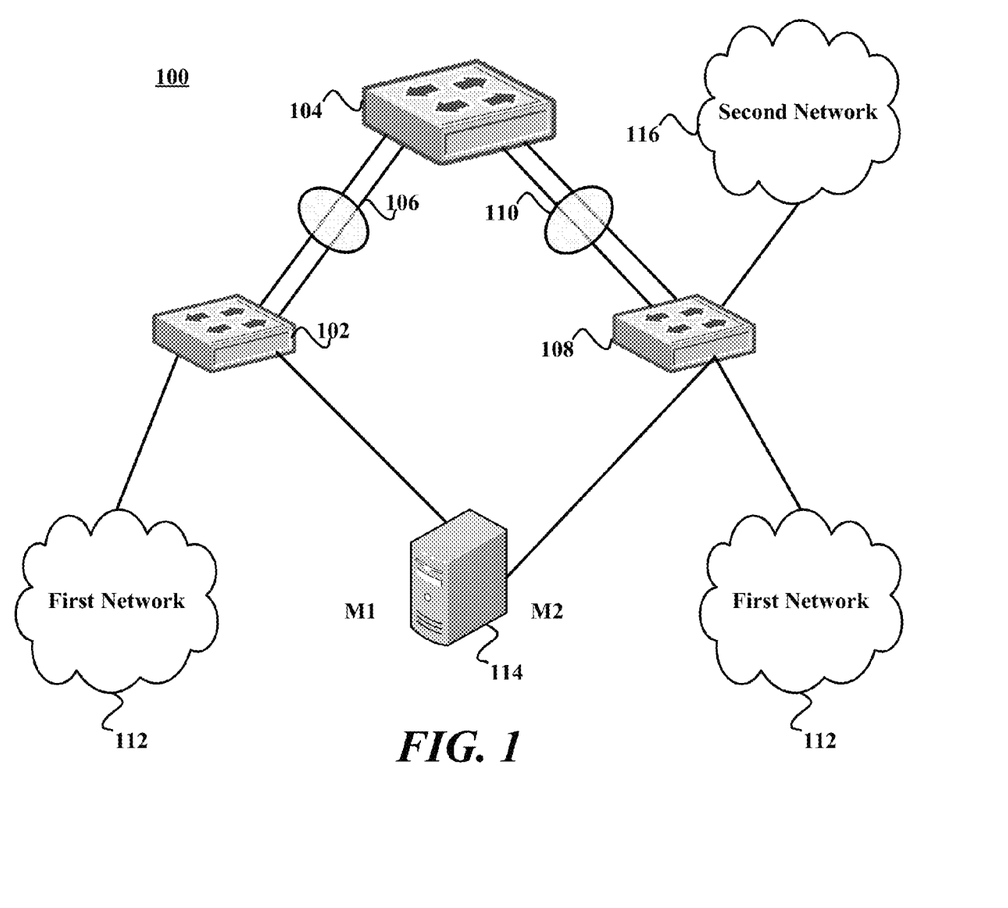
FIG. 1 is a diagram illustrating an information handling system, consistent with some embodiments.

FIG. 1 is a diagram illustrating an information handling system, consistent with some embodiments. As shown in FIG. 1, a first network device 102 is in communication with a gateway device 104 over a communication link 106. As used herein, components are in communication with each other if they are capable of sending and/or receiving information either directly or indirectly. Consistent with some embodiments, first network device 102 may be a switch and, in some embodiments, a layer 2 (L2) switch. Gateway device 104 may be a gateway router, such as a layer 3 (L3) gateway router, or a L2 switch/L3 gateway router combination device. In some embodiments, communications link 106 may correspond to a link aggregation group (LAG). Gateway device 104 is also in communication with a second network device 108 over a communications link 110 that also may be a LAG. Similar to first network device 102, second network device 108 may be an L2 switch in some embodiments. First network device 102 and second network device 108 are also in communication with a first network 112 and server 114. Consistent with some embodiments, first network 112 represents other devices and nodes on the same network as first network device 102, gateway device 104, second network device 108 and server 114. That is, first network device 102, gateway device 104, second network device 108, and server 114 are all on the same subnet. As also shown in FIG. 1, second network device 108 is also in communication with a second network 116, that is on a different network and subnet than first network device 102, gateway device 104, second network device 108, first network 112, and server 114. First network 112 and second network 116 may correspond to local area networks (LANs), wide area networks (WANs), and virtual networks such as virtual local area networks (VLANs).

According to some embodiments, server 114 is a load balancing server. A load balancing server is a server that balances the load of information handling system 100 by balancing the traffic between the nodes of system 100. For example, server 114 may be configured to balance the information handled by first network device 102, second network device 108, and other devices in first network 112. According to some embodiments, server 114 may have multiple network interfaces for interfacing with the devices in system 100. For example, server 114 may have a first network interface in communication with first network device 102 that has an Internet protocol (IP) address and a first media access control (MAC) address. Server 114 may also have a second network interface in communication with second network device 108 that has the same IP address and a second MAC address that is different than the first MAC address. Consistent with some embodiments, server 114 may have network interfaces for each network device that it is in communication with and for which it is used to balance the load. In operation, when information traffic is handled by server 114, it will send out information on a particular network interface in order to balance the load on system 100.

Figure 2:
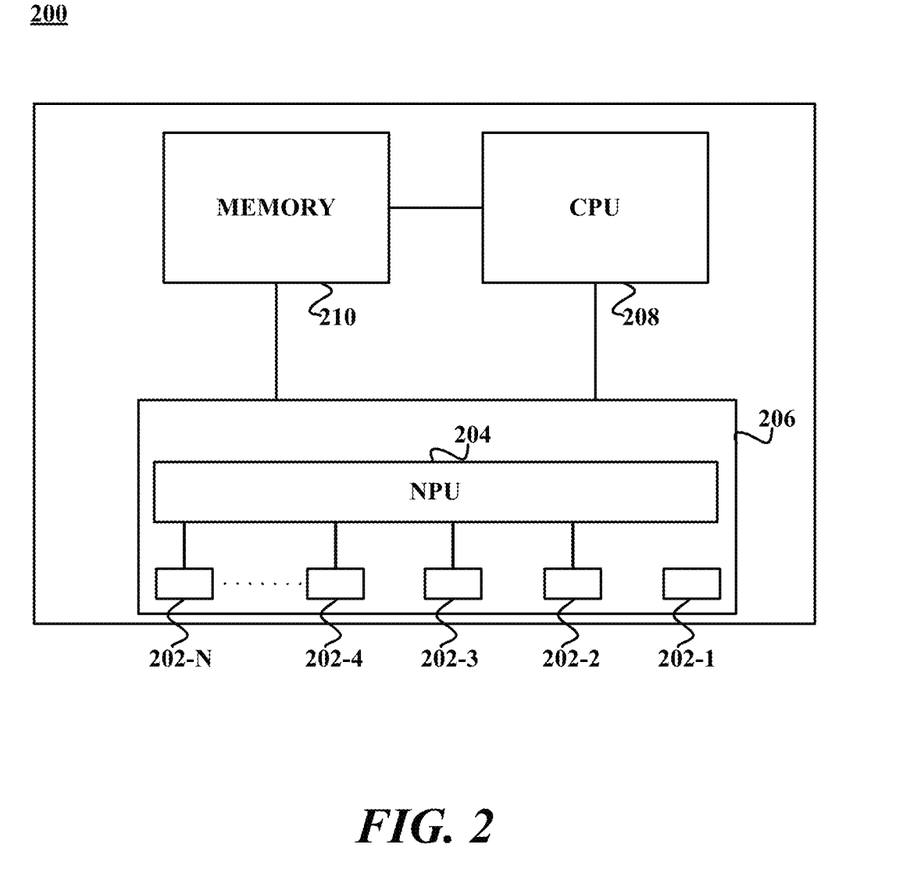
FIG. 2 is a diagram illustrating a network device, consistent with some embodiments.

FIG. 2 is a diagram illustrating a network device, consistent with some embodiments. Device 200 may correspond to first network device 102 or second network device 108 shown in FIG. 1 as part of information handling system 100. Moreover, device 200 may correspond to a switch, such as an L2 switch, a layer 3 (L3) switch, or a combination switch capable of performing both L2 and L3 switching. As shown in FIG. 2, device 200 includes a plurality of ports 202-1-202-N (collectively referred to as ports 202) coupled to a network processing unit (NPU) 204, which are both part of a network interface component 206. Network interface component 206 is coupled to a processing unit 208 and a memory 210. Processing unit 208 is also coupled to memory 210, and may include one or more processors that are capable of executing instructions stored in memory 210 for switching and routing information, for example. Ports 202 may be in communication with server 114, first network 112, second network 116, and gateway device 104. For example, if network device 200 corresponds to first network device 102, a first port 202-1 may be in communication with server 114, a second port 202-2 may be in communication with first network 112, and a third port 202-3 may be in communication with gateway device 104 over communications link 106, which may be a LAG.

Figure 3:
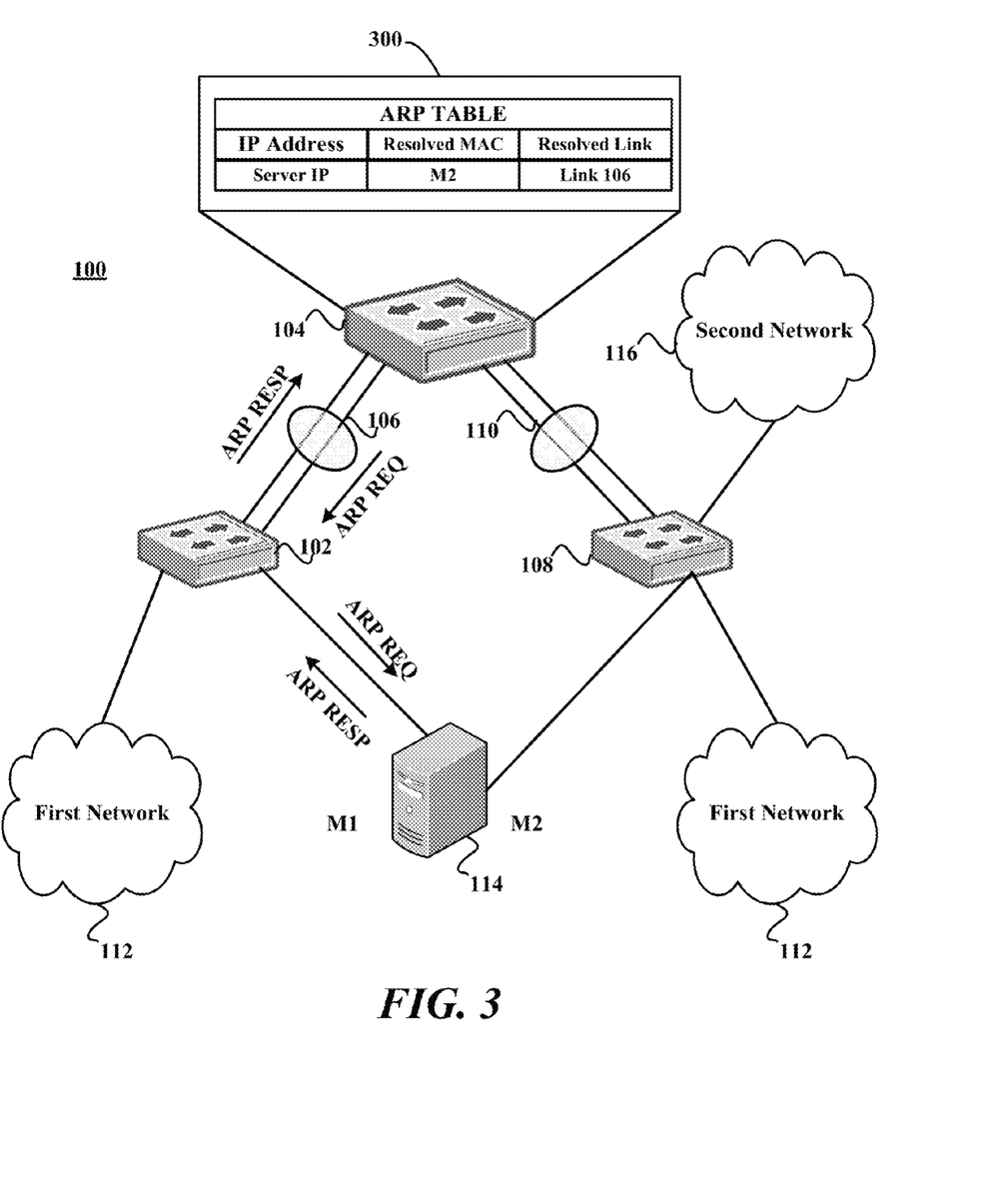
FIG. 3 is a diagram illustrating an address resolution protocol (ARP) request flow in an information handling system, consistent with some embodiments.

FIG. 3 is a diagram illustrating an address resolution protocol (ARP) request flow in an information handling system, consistent with some embodiments. As shown in FIG. 3, gateway device 104 in information handling system 100 maintains an ARP table 300 in a memory. Consistent with some embodiments, ARP table includes entries for at least an IP address of server 114, a MAC address of server 114, and a resolved link on which the particular IP address and MAC address may be reached. That is, gateway device 104 needs to know the IP address to MAC binding of server 114 in order to be able to route information to server 114. To fill the entries in ARP table, gateway device 104 may send an ARP request to server 114 via network devices that it is in communication with, such as first network device 102 and second network device 108. For example, an ARP request received by first network device 102 would be processed by processing component 208 and sent to server 114. Server 114 would receive the ARP request and transmit an ARP response to gateway device 104 via first network device 102. The ARP response would include the IP address of server and a MAC address of the interface of server 114. Consistent with some embodiments, server 114 may be a load balancing server having multiple interfaces each having its own MAC address. As a result, server 114 may include in the ARP response the MAC address for any of its interfaces. As an example shown in FIG. 3, server 114 includes two interfaces: a first interface having a MAC address M1 that is in communication with first network device 102; and a second interface having a MAC address M2 that is in communication with second network device 108. As shown in FIG. 3, as an example, server 114 may respond with M2 as the MAC address of server 114. Gateway device 104 would then receive the ARP response via first network device 102 over communications link 106, and store the IP address and received MAC address of server 114 and the resolved link, which is communications link 106, in ARP table 300. As a result, gateway device has resolved the ARP to M2 via communications link 106 and ARP table 300 includes an IP address of "Server IP", a MAC address of "M2" and a resolved link of communications link 106. A similar process would occur with respect to second network device.

Figure 4:
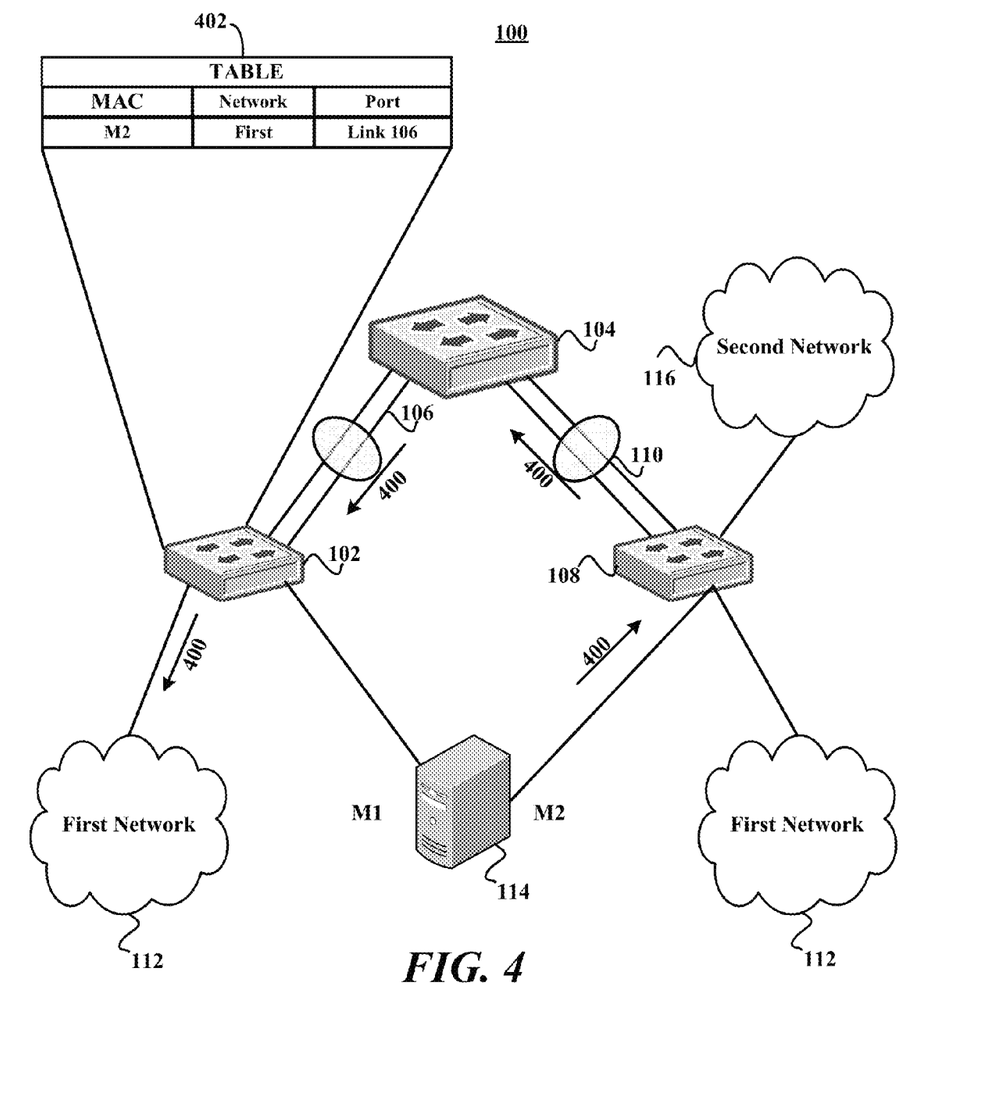
FIG. 4 is a diagram illustrating routing information in an information handling system, consistent with some embodiments.

FIG. 4 is a diagram illustrating routing information in an information handling system, consistent with some embodiments. Information, as used herein, may include data and data packets. As shown in FIG. 4, server 114 is routing information 400 to first network 112 through second network device 108, gateway device 104, and first network device 102. When first network device 102 receives information 400, it learns the MAC address of server 114, the network or subnet that server 114 is on, and the port 202 on which information 400 is received, and saves this information in an address table 402 in memory 210. For example, as shown in FIG. 4, address table 402 shows the MAC address of server 114 as being M2, the network as being first network 112, and the port 202 on which information 400 was received as being the port in communication with communications link 106.

Figure 5:
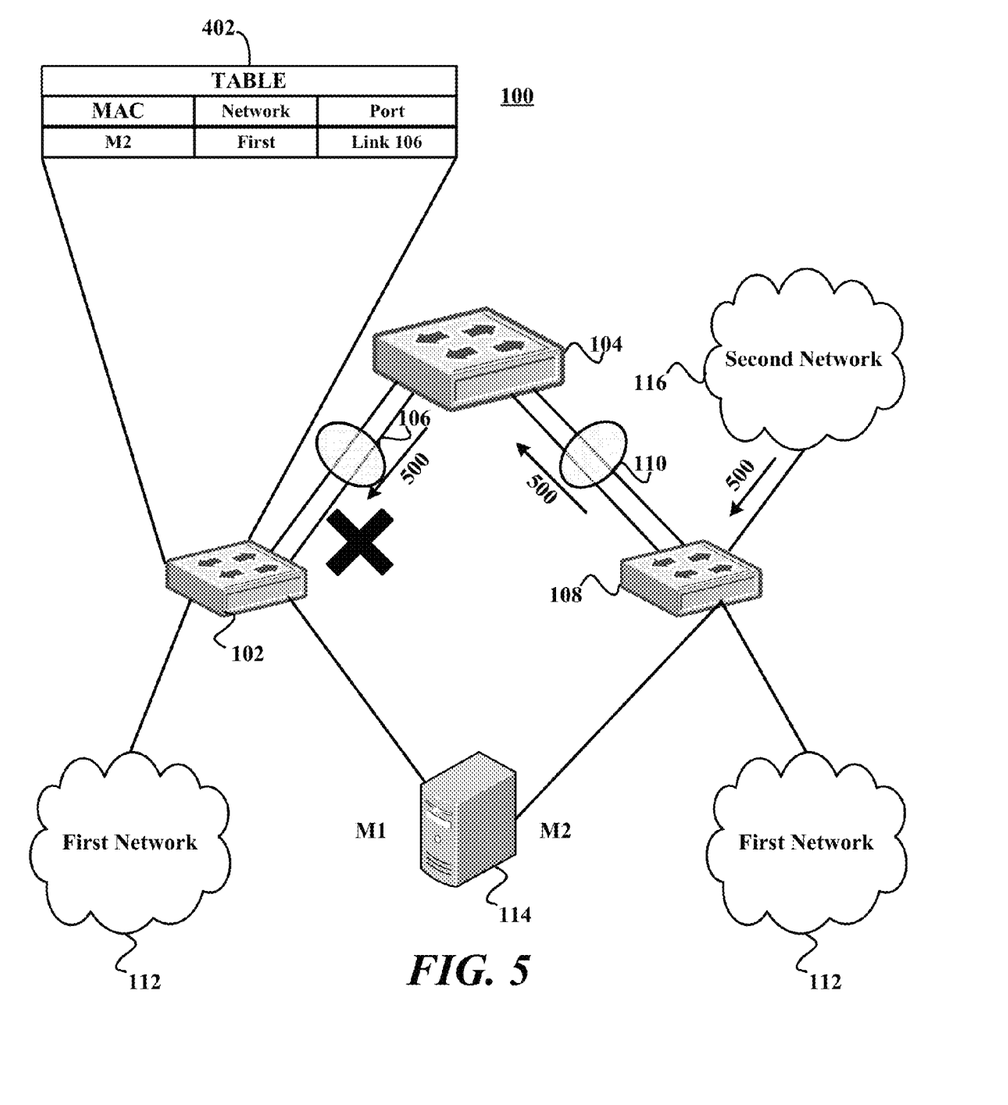
FIG. 5 is a diagram illustrating routing information from a different network in an information handling system, consistent with some embodiments.

FIG. 5 is a diagram illustrating routing information from a different network in an information handling system, consistent with some embodiments. As shown in FIG. 5, when information 500 sent from second network 116 is routed to information handling system 100, it needs to be routed to server 114 for load balancing. Information 500 is sent from second network to second network device 108, which routes the information to gateway device 104. Gateway device 104 performs a lookup in ARP table 300 to find the address and route to server 114, which is Server IP, M2, and link 106. Accordingly, gateway device 104 routes information 500 over link 106 to first network device 102. First network device 102 receives information 500 and performs a lookup in address table 402, which resolves MAC M2 of server 114 over link 106. However, link 106 is also the same link over which information 500 was received. As a result, information 500 would be dropped and lost at first network device 102. In instances where the ingress link and the egress link are the same, as is the case illustrated in FIG. 5, this is called source suppression, and results in information 500 from second network 116 being dropped or lost.

In order to prevent source suppression, information 500 sent to server 114 may be multicast from gateway device 104 so that even if information 500 is dropped on one path, such as the path from gateway device 104 to first network device 102, information 500 would still reach server 114 over another path, such as from gateway device 104 to second network device 108. However, this may be waste of bandwidth, and may result in duplicate copies of information 500 being sent to server.

Figure 6:
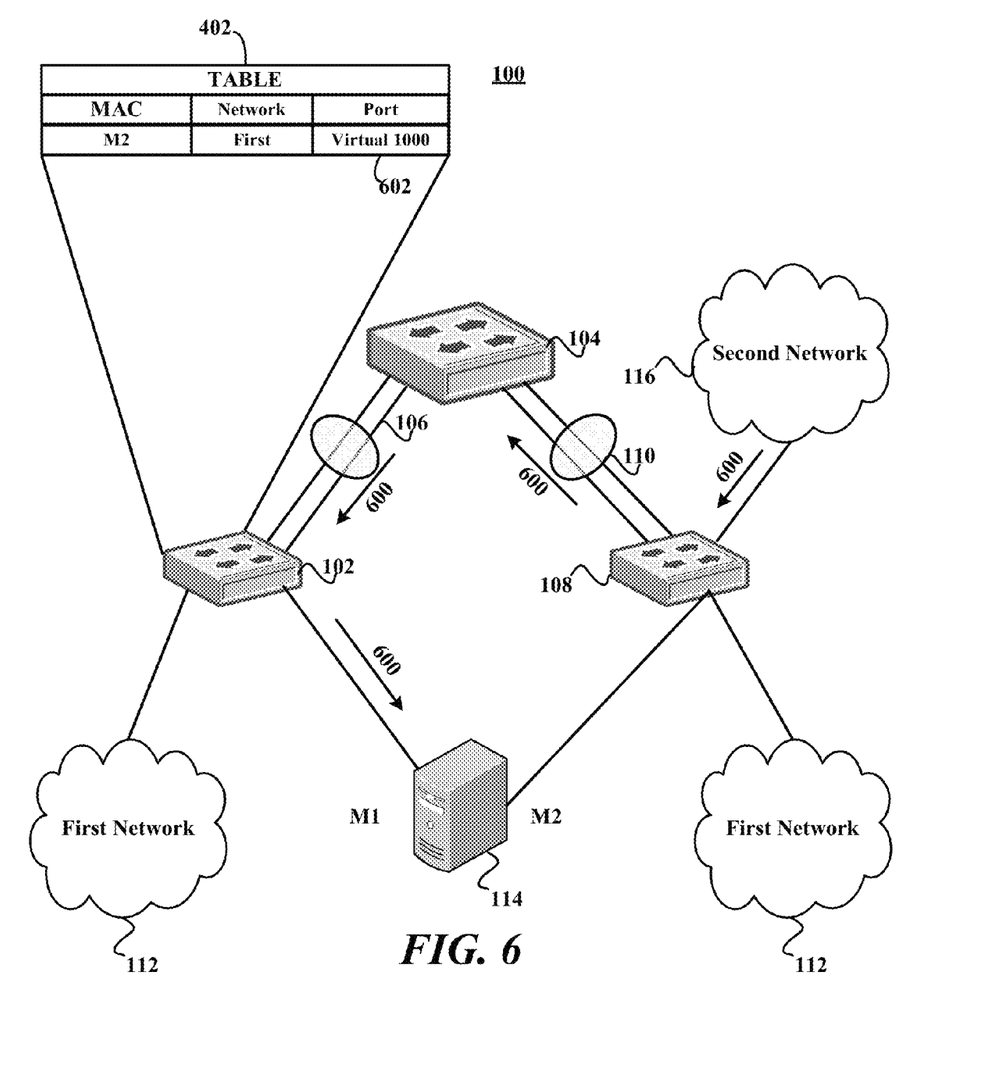
FIG. 6 is a diagram illustrating routing information from one network to a load balancing network in an information handling system, consistent with some embodiments.

FIG. 6 is a diagram illustrating routing information from a first network to a second network in an information handling system, consistent with some embodiments. As shown in FIG. 6, just as in FIG. 5, when information 600 is routed to server 114 from second network 116, it is routed from second network device 108 to gateway device 104 to first network device 102, based on the information stored in ARP table 300. However, unlike the example shown in FIG. 4, when first network device 102 receives information from gateway device 104 and uses that information to learn the MAC address of server 114 and the port on which the MAC address is resolved, first network device 102 assigns a virtual port 602 that internally points to the physical port 202 that is in communication with server 114. As a result, first network device 102 will always know the correct port that is in communication with server 114, even if information routed to first network device 102 originating from a different interface and MAC address of server 114 contains a different port, such as shown in FIGS. 4 and 5.

According to some embodiments, processing component 208 of first network device 102 may associate at least one of the server's IP address and a MAC address of any interface of server 114 to virtual port 602 and store virtual port 602 in address table 402 in memory 210. Further, virtual port 602 will internally point to a port in communication with server 114, which is also stored in memory 210. Consistent with some embodiments, the physical port may in communication with first network device 102 may be automatically configured and stored in memory 210 by a user or may be automatically learned by snooping an ARP response packet or other information sent or received directly to or from server 114. Consequently, when first network device 102 learns the MAC address and port in the normal course of routing information in information handling system 100, such as shown in FIG. 4, the MAC address will be resolved to a virtual port that points to the correct physical port in communication with server 114, thus preventing source suppression when routing information from second network 116. Moreover, multicasting of packets and the waste of bandwidth and duplication of packets that goes with it does not occur.

According to some embodiments, processing component of first network device 102 may be configured to change a destination MAC address of information 600 sent to server 114 as information 600 is forwarded on virtual port 602. In particular, when first network device 102 receives information 600 from gateway device 104, information 600 may include a destination address, such as the IP address of server 114 and a MAC address of server 114, based on information stored in ARP table 300 and address table 402, which would provide a MAC address of M2. When first network device 102 receives information 600 having this MAC address, processing component 208 routes information 600 according to virtual port 602. Processing component 208 may also check the pointer from virtual port to determine the correct MAC address, M1, and change the MAC address to M1 in information 600. Consequently, if the network interface of server 114 in communication with first network device 102 only accepts information having the correct destination address, processing component 208 of first network device 102 can change the MAC address to the correct MAC address before information 600 is forwarded to server 114.

Figure 7:
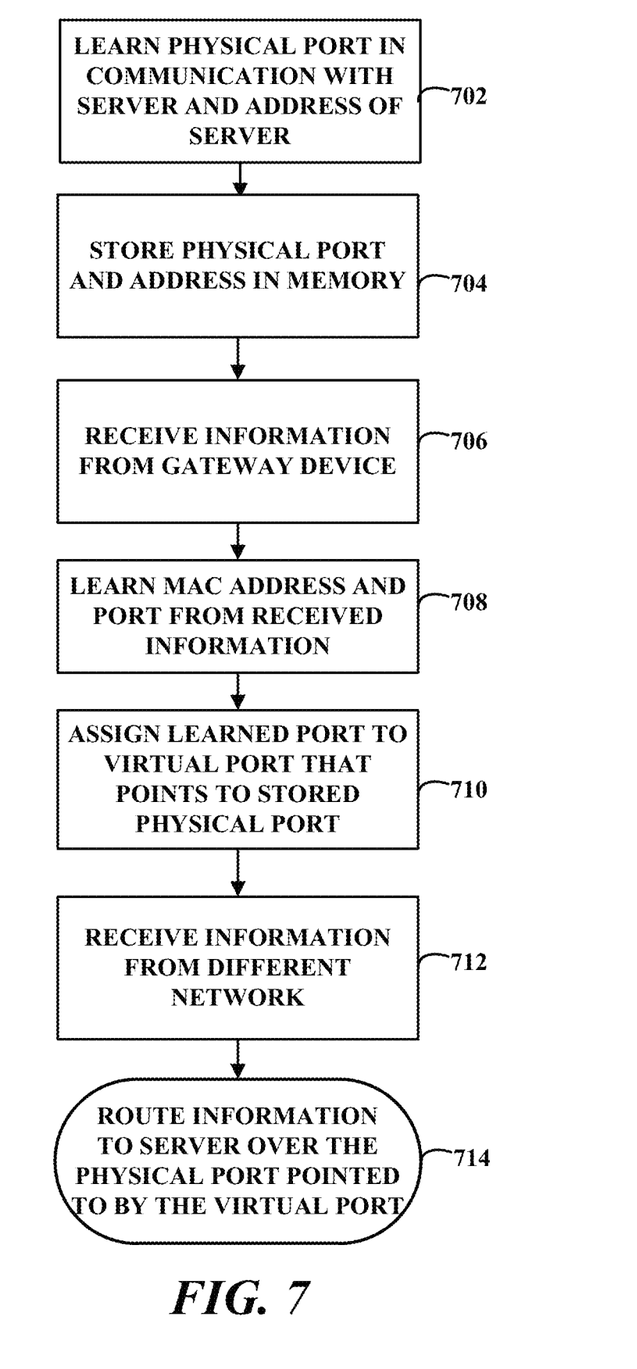
FIG. 7 is a flowchart illustrating a method for routing information from a first network to a load balanced network, consistent with some embodiments.

FIG. 7 is a flowchart illustrating a method for routing information from a first network to a load balanced network, consistent with some embodiments. For the purpose of illustration, the method shown in FIG. 7 may be described with reference to any of FIGS. 1-6. The method shown in FIG. 7 may be embodied in non-transient, tangible, computer-readable media, such as memory 210, and may be executed by processing component 206 for the purpose of performing the method. As shown in FIG. 7, a network device, such as first network device 102 or second network device 108, learns the physical port 202 that is in communication with server 114 and an address of server (702). Consistent with some embodiments, the network device learns the physical port 202 and address of server 114 by snooping an ARP response packet routed through the network device or other information routed through the network device. In other embodiments, a user may manually enter this information into the network device. The learned physical port 202 and address of server 114 is stored in memory 210 (704).

The network device then receives information 400 from gateway device 104 (706). The information may include data packets and may be routed from a first network 112. The network device will the learn the MAC address and port from the received information (708), and this information may be stored in an address table 402 in memory 210. Processing component 208 of the network device may then assign the learned port to a virtual port 602 that points to the stored physical port (710). Consequently, when the network device receives information 600 from a different network, such as second network 116 (712), processing component 208 will correlate the assigned virtual port 602 to the stored physical port, and route the information 600 to server 114 over the physical port pointed to by virtual port 602 (714). The method shown in FIG. 7 is capable of routing information from one network to a load balanced network without source suppression and the loss of information.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods that reliably route information to a load balancing server without the dropping packets. In particular, the systems, devices, and methods provided herein assign a port coupled to a load balancing server to a virtual port that points to the port such that when information is received from other nodes in the network, the port coupled to the load balancing server is not forgotten or overwritten such that information may be routed to the load balancing server without loss. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, the system comprising:
   a server; and
   a first switch in communication with the server over a physical port, the first switch comprising:
   a network interface component configured to receive information from the server on the physical port;
   a memory configured to store an address of the server and an address of a virtual port in an address table, the virtual port internally pointing to the physical port; and
   one or more processors coupled to the network interface component and the memory, the one or more processors configured to perform operations comprising:
   identifying the physical port on which the information from the server arrives; and
   in response to identifying the physical port on which the information from the server arrives:
   assigning the physical port to the virtual port for data addressed to the server; and
   sending the data addressed to the server while avoiding source suppression active on the physical port by sending the data addressed to the server to the physical port through the virtual port.

2. The system of claim 1, wherein the operations further comprise routing information from a different network to the server over the physical port pointed to by the virtual port stored in the address table.

3. The system of claim 1, wherein the address of the server comprises at least one of an internet protocol (IP) address and a media access control (MAC) address.

4. The system of claim 1, further comprising a gateway router in communication with the first switch over a communications link.

5. The system of claim 1, wherein the operations further comprise changing a destination address of the information to a correct destination address of the server.

6. The system of claim 1, wherein the server comprises a load balancing server.

7. The system of claim 1, wherein the server and the first switch are on a same network.

8. The system of claim 1, wherein the server is further configured to receive address resolution protocol (ARP) requests and send ARP responses including an address of the server.

9. The system of claim 1, wherein the first switch comprises a layer 2 (L2) switch.

10. A switch comprising:
    one or more processors; and
    a memory, the memory storing instructions that, when executed by the one more processors, cause the switch to perform a method comprising:
    identifying a physical port in communication with a server and an address of the server;
    storing the address of the server and an identifier of the physical port;
    receiving information from a gateway device;
    in response to identifying the address of the server and the physical port in communication with the server, assigning the physical port to a virtual port that internally points to the physical port;
    receiving data addressed to the server; and
    routing the data addressed to the server while avoiding source suppression active on the physical port by sending the data addressed to the server to the physical port through the virtual port.

11. The switch of claim 10, wherein identifying the physical port in communication with the server and the address of the server comprises identifying the physical port in communication with the server and the address of the server from address resolution protocol (ARP) responses sent through the switch.

12. The switch of claim 11, wherein the address of the server comprises at least one of an internet protocol (IP) address and a media access controller (MAC) address.

13. The switch of claim 11, wherein routing the data addressed to the server comprises changing a destination address of the information to a correct destination address of the server.

14. The switch of claim 10, wherein the server comprises a load balancing server.

15. The switch of claim 14, wherein the server is on a same network as the switch.

16. A method of routing information from a second network to a server on a first network, the method comprising:

identifying a physical port in communication with the server and an address of the server;
storing the address of the server and an identifier of the physical port in a memory;
receiving information from a gateway device;
in response to identifying the address of the server and the physical port in communication with the server, assigning the identified physical port to a virtual port that internally points to the physical port;
receiving data addressed to the server; and
routing the data addressed to the server to the server while avoiding source suppression active on the physical port by sending the data addressed to the server to the physical port through the virtual port.

17. The method of claim 16, wherein identifying the physical port in communication with the server and the address of the server comprises identifying the physical port in communication with the server and the address of the server from address resolution protocol (ARP) responses.

18. The method of claim 16, wherein the address of the server comprises at least one of an internet protocol (IP) address and a media access controller (MAC) address.

19. The method of claim 16, wherein routing the data addressed to the server comprises changing a destination address of the information to a correct destination address of the server.

20. The method of claim 16, wherein the server comprises a load balancing server.

* * * * *